(Model.)
T. H. DIBBLE.
Insect Trap.
No. 240,896. Patented May 3, 1881.
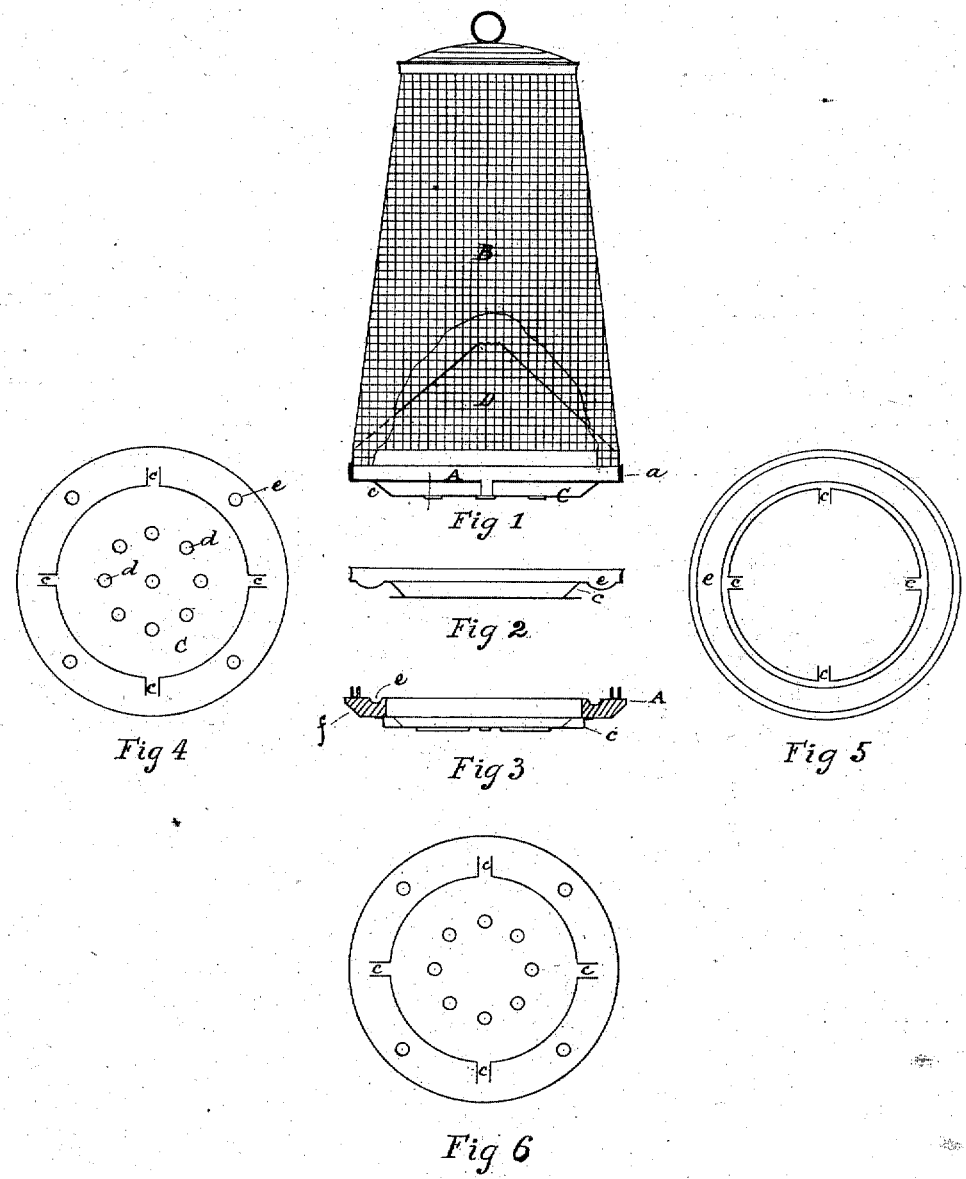
Witnesses
Henry J. Heath
R. Francis Wheeler
Inventor
Theodore H. Dibble
by R. N. Voorhees
Attorney

UNITED STATES PATENT OFFICE.

THEODORE H. DIBBLE, OF TRENTON, NEW JERSEY, ASSIGNOR TO THE DIBBLE MANUFACTURING COMPANY, OF SAME PLACE.

INSECT-TRAP.

SPECIFICATION forming part of Letters Patent No. 240,896, dated May 3, 1881.

Application filed October 18, 1880. (Model.)

*To all whom it may concern:*

Be it known that I, THEODORE H. DIBBLE, of Trenton, in the county of Mercer and State of New Jersey, have invented a new and useful Improvement in Fly-Traps, which improvement is fully set forth and illustrated in the following specification and accompanying drawings.

This invention relates more particularly, though not exclusively confined, to that class of fly-traps made of wire cloth or gauze; and its object is to provide a cheap and simple base for the trap or cage, which shall offer as great facility of ingress as possible to the insects, while at the same time adapted to receive and hold the bait at a point or points most conducive to the allurement of the insects under and up into the trap.

To this end, therefore, the invention consists of a base proper and a sub-base united together, and constructed as hereinafter described and claimed, and upon which the whole superstructure of the trap or cage proper is sustained or supported. The said sub-base is, in shape, preferably a plate, disk-like or circular; but it may be square, or of any other convenient shape.

In the accompanying drawings, Figure 1 is an elevation of the trap, showing the base in section. Fig. 2 is a modification of the base, also in section. Fig. 3 is another modification of the base when the base proper and sub-base are made of different materials. Fig. 4 is a plan of the base shown in Fig. 1. Fig. 5 is a plan of the base shown in Fig. 2. Fig. 6 is a plan of the base shown in Fig. 1, with the sub-base turned bottom up.

Like letters in the several figures indicate the same parts in each figure.

The base shown in Fig. 1 is cut, punched, or pressed out of some thin metal, such as sheet-tin or other suitable material or composition. The base proper, A, is annular and provided with a flange, $a$, into which the body B of the trap is fitted. The particular method of joining the trap and the base, however, is not important, and forms no part of this invention.

The sub-base C is preferably a thin plate set opposite the opening in the annular base A, and united thereto by the open web $c$. Upon the sub-base C may be placed the bait, the surface being slightly indented or roughened in circles, squares, lines, or other forms, as shown at $d$, if desired, in order the more securely to hold the bait. The surface of the annular base A is corrugated or formed into a groove or separate recesses $e$, in order to hold additional, and preferably liquid, bait.

In the modification shown in Fig. 2 the receptacle or groove $e$ is shown formed in the base proper outside of the open web $c$, instead of on the inner side thereof, said web running from the outer peripheral edge of said base.

In the modification shown in Fig. 3 the base proper is made of wood or other material and thicker than the sub-base, which may either be of one piece therewith, cut or pressed therefrom, or a separate piece united thereto by tacks, screws, or otherwise. The base A is in this figure seen beveled downward, as at $f$, which form, in conjunction with the thin sub-base C, not only offers the least possible opposition to the insects' ingress under the trap in search for the bait, but tends to direct or guide them straight-way thereunder, as fully explained below.

The operation of the trap is very simple and as follows: The trap being placed on a table, floor, or other suitable support and properly baited, preferably with some solid bait on the sub-base C, and with very liquid bait in the receptacle $e$, the flies will be attracted to the bait, and, first, alighting on the table, will walk directly through or between the openings in the web $c$ to the bait on the sub-base C. Upon reaching the bait upon C (clearly visible from the outside) the insects will be directly under the trap, whence, crowded by the following insects and lured by the bait in the groove $e$, the insects will fly or ascend to that bait, from which, when gorged or expelled, they will ascend (according to the natural habit of the insects) through the cone D into the trap above the case or cage A.

The advantage of having solid bait below and liquid bait above is that the fly will be attracted first to the solid bait and from the solid to the liquid bait, the latter being such that the fly can quickly gorge himself, when he will leave it and ascend into the trap, making room for others to follow his course and example.

It is quite obvious that all the bait-receptacles of this trap are situated entirely outside of the case or cage proper.

I do not claim any particular form of wire cloth or gauze case or cage for the fly-trap, nor any special frame therefor, nor any method of binding the edges thereof, as any of the methods long practiced in the art of wire-working, (and akin to methods of uniting and binding textile fabrics,) such as binding the edges of the wire-cloth with stouter wire or thin metal, and any framing, such as is used for bracing the wire covering of cages or lanterns, may be used in supplying a proper and suitable wire case, cage, or cylinder for mounting upon the base forming the subject of this invention. Such conformation, however, is not new, *per se*, for a single base, and therefore, while I make no claim herein for such conformation, *per se*, it may be used, if preferred, for the sake of more conveniently holding the bait, or for imparting a more finished appearance to the sub-base.

I do not confine myself to making the sub-base entirely a flat sheet. It may, if preferred, be flanged at its sides or rim and depressed in the center for the bait-receptacle, or it may be crimped or corrugated for such purpose.

As of my invention, therefore, I claim—

1. In combination with an annular base adapted to support a fly trap or cage, as described, a sub-base, preferably of thin material, fixed or fastened opposite the opening in said base by peripheral strips or pieces, forming an open web between said base and sub-base, the whole being in but one piece of the same material, substantially as and for the purposes set forth.

2. In combination with the case or cage of a fly-trap, an annular base permanently fixed or fastened at suitable intervals, as described, upon a supporting sub-base, and provided with a bait receptacle or receptacles situated entirely outside of the cage proper, whereby the insects are lured under and into the trap, substantially as set forth.

3. In combination with the case or cage of a fly-trap, an annular base permanently fixed or fastened at suitable intervals, as described, upon a supporting sub-base, said bases respectively provided with a bait receptacle or receptacles situated entirely outside of the cage proper, whereby the insects are first lured upon the sub-base under the trap and then further lured to ascend toward and into the cage proper, substantially as set forth.

T. H. DIBBLE.

Witnesses:
C. E. TULLER,
F. G. FORT.

It is hereby certified that in Letters Patent No. 240,896, granted May 3, 1881, to Theodore H. Dibble, assignor to the Dibble Manufacturing Company, for an improvement in "Insect Traps," the parts of the paragraph embraced in lines 16 to 27, both inclusive, on page 2 of the printed specification attached to and forming a part of said Letters Patent, were erroneously transposed. That portion commencing with the words "such conformation," in line 16, and ending with the word "sub-base," in line 22, should follow and not precede the portion commencing with the words "I do not confine," in line 23, and ending with the words "for such purpose," in line 27; that the proper corrections have been made in papers and records pertaining to the case in the Patent Office and are hereby made in said Letters Patent.

Signed, countersigned, and sealed this 11th day of May, A. D. 1881.

[SEAL.]

A. BELL,
*Acting Secretary of the Interior.*

Countersigned:
V. D. STOCKBRIDGE,
*Acting Commissioner of Patents.*